United States Patent [19]

Rink

[11] Patent Number: 5,029,942
[45] Date of Patent: Jul. 9, 1991

[54] BACK REST SUPPORT STRUCTURE FOR A VEHICLE SEAT

[75] Inventor: Manfred Rink, Cologne, Fed. Rep. of Germany

[73] Assignee: Bayer Aktiengesellschaft, Bayerwerk, Fed. Rep. of Germany

[21] Appl. No.: 444,088

[22] Filed: Nov. 30, 1989

[30] Foreign Application Priority Data

Dec. 9, 1988 [DE] Fed. Rep. of Germany ..... 38415321

[51] Int. Cl.⁵ ................................................ A47C 7/02
[52] U.S. Cl. .................................... 297/452; 297/460; 297/DIG. 2
[58] Field of Search ............... 297/452, DIG. 2, 460, 297/457, DIG. 1

[56] References Cited

U.S. PATENT DOCUMENTS

| | | | |
|---|---|---|---|
| 3,669,498 | 6/1972 | Meyers et al. | 297/460 X |
| 3,695,707 | 10/1972 | Barecki et al. | 297/460 |
| 3,697,133 | 10/1972 | Wolofski | 297/460 |
| 4,544,204 | 10/1985 | Schmale | 297/452 |
| 4,588,228 | 5/1986 | Nemoto | 297/452 |
| 4,681,366 | 7/1987 | Lobanoff | 297/191 |
| 4,805,962 | 2/1989 | Sacco et al. | |
| 4,861,104 | 8/1989 | Malak | 297/452 X |
| 4,871,209 | 10/1989 | Handelman | 297/DIG. 2 X |
| 4,898,426 | 2/1990 | Schulz et al. | 297/452 |

FOREIGN PATENT DOCUMENTS

| | | |
|---|---|---|
| 7129577 | 8/1971 | Fed. Rep. of Germany . |
| 3100202 | 8/1982 | Fed. Rep. of Germany . |
| 1254851 | 11/1971 | United Kingdom . |

*Primary Examiner*—Jose V. Chen
*Attorney, Agent, or Firm*—Joseph C. Gil; Aron Preis

[57] ABSTRACT

In order to be able to rationalize the mass production of back rest support structures from plastic for vehicle seats by injection molding, an injection molded part is provided which comprise a back shell and a frame which surrounds it like a cassette, the frame consisting of U-section side members which are open at the side and a U-section cross member which is open on one side.

11 Claims, 2 Drawing Sheets

BACK REST SUPPORT STRUCTURE FOR A VEHICLE SEAT

FIELD OF THE INVENTION

The invention relates to a back rest support structure for a vehicle seat, especially an automobile seat, and to a vehicle seat back rest comprising said support structure.

BACKGROUND OF THE INVENTION

Back rest support structures for vehicle seats, especially automobile seats, are made as a rule from tubular steel or sheet metal. For this purpose complex stamped and bent parts have to be produced in costly processes, assembled and protected against rust. They require an additional covering because they would not otherwise be acceptable to the consumer as visible structures. The support structure and back pad as well as the cover are frequently joined together in such a way that it is difficult or impossible to replace a defective pad or cover alone.

The object of the invention is to provide a back rest support structure for vehicle seats, especially automobile seats, but also for aircraft or boat seats, which can be produced easily and has the necessary physical properties.

SUMMARY OF THE INVENTION

This object is achieved by a back shell which is surrounded like a cassette by a frame which comprise a U-section side members which are open towards the exterior and a U-section cross member which connects the upper ends of the side members and is open on one side, the back shell and the members comprise a single injection molded part.

DETAILED DESCRIPTION OF THE INVENTION

This construction of the back rest support structure permits economical mass production using thermoplastic or thermosetting plastics, particularly fiber reinforced thermoplastics or thermosetts, in particular, glass reinforced polyamide-6, polyamide-6.6, or a polycarbonate/acrylonitrile-butadiene-styrene copolymer blend, with a glass fiber content in each case of approximately 20 to 40% by weight. Naturally, this back rest support structure must be sufficiently sturdy to withstand normal stresses. In addition, the attachment points for the hinge fittings must have the appropriate strength. In order to avoid breaking and splitting of the back rest support structure in the event of a crash, potential deformation points which are designed to yield more readily than the back rest support structure are provided on other parts of the seat, for example on the fittings. As regards bending strength and torsional stability the construction of the members as U-sections comes very close to that of closed hollow sections. However, the latter are very costly to unmold. It is only necessary to have two side slides in the forming tool for the production of the novel back rest support structure. The back shell may be flat, but it may also approximate the shape of a body. The U-section side members and the cross member form a rigid frame to accommodate the seat pad which rests against the back shell. The connections for the fittings and the seat adjustment and, if required, other elements can be accommodated in the open cavities in the side members. The width of the side members can vary over their length.

Figure 4:
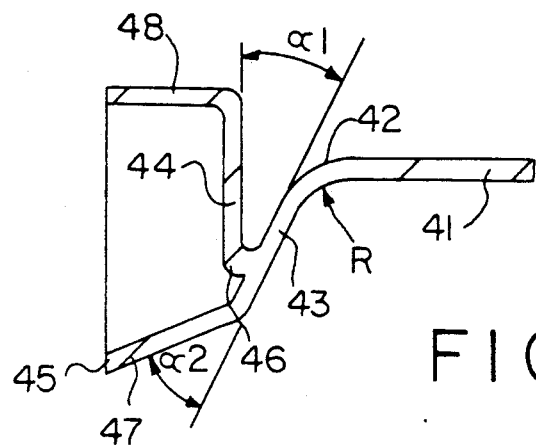

The back shell, as depicted especially in FIG. 4, preferably runs forward towards the side members and is rounded, then bent, and branches, turning back to become the central parts of the side members and running on to become the front flanks thereof. This construction is suitable for plastic materials and prevents jagged breaks while ensuring good transfer of stress between the members and the back shell.

Figure 3:
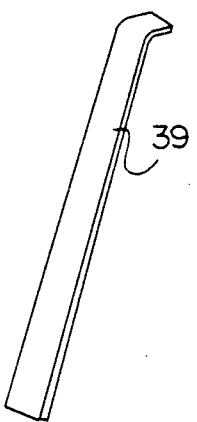

According to a preferred embodiment, at least one of the members has a cover—such as shown in FIG. 3. This cover serves for improving the appearance. It can be removable and replaceable; however, it can also be permanently connected to the side member to form a box section in order to increase the strength. The same applies to the covering of the cross member.

Molded ribs are preferably arranged in the cavities in the members. These serve for reinforcement and in particular, they increase the bending strength and torsional stability. By appropriate construction of the cavity in the forming tool they can be molded directly with the member, so that no additional work is necessary.

In a further special embodiment, the front flanks of the side members are curved towards the front like a shell. This construction provides lateral reinforcement for the back pad which is to be placed upon it, so that the body of the occupant is positioned better at the sides. In this way they form a type of shell together with the back rest.

In a further special embodiment, the cross member is open towards the front and forms the cover for a head rest supporting plate.

The so-called head rest supporting plate has stops for the adjustment of the head rest.

According to another embodiment, the cross member is open towards the rear and forms a storage chamber which has a flap associated with it as a cover.

Depending upon the size of this storage chamber it can be used for cards, first aid box, etc. This flap should be constructed so as to prevent injury and in particular, should have a recessed catch.

The flap is preferably provided on the exterior with a protective cushion. This serves to protect the back occupant in the event of a crash.

The novel back rest support structure also has the advantage that the back pad can be replaced without difficulty. Additionally, it is no longer necessary to arrange the cover directly on the back pad but, with appropriate design, it can be pulled over the back rest or fixed thereto. A releasable fixing of the cover is also possible, if the pad with the cover can be fixed to the back rest support structure. In this way it is possible for the vehicle to be equipped at the car dealership with a back pad of a suitable hardness and a seat covering which is acceptable to the consumer so as to rationalize the manufacture on the production line. This means that the buyer's requirements in this connection can be met at the last moment, i.e. before the vehicle is handed over.

The novel vehicle seat back rest with a back rest support structure of the type described above is characterized in that the back pad which is laterally surrounded by the frame at least partially covers the front flanks of the side members. This results in the creation of lateral guiding zones for the body of the occupant just in this region which are harder than in the central part, without the need for pads with zones of foam material of differing hardness.

The back pad preferably also covers the front face for the cross member.

In this way, it is ensured that for occupants of widely differing sizes, this part of the back rest support structure is also padded in order to prevent injuries in a crash.

According to a further special embodiment, the back pad covers the outer face of the side members. This embodiment serves not only for improving the appearance but also reduces the danger of injury.

Figure 1:
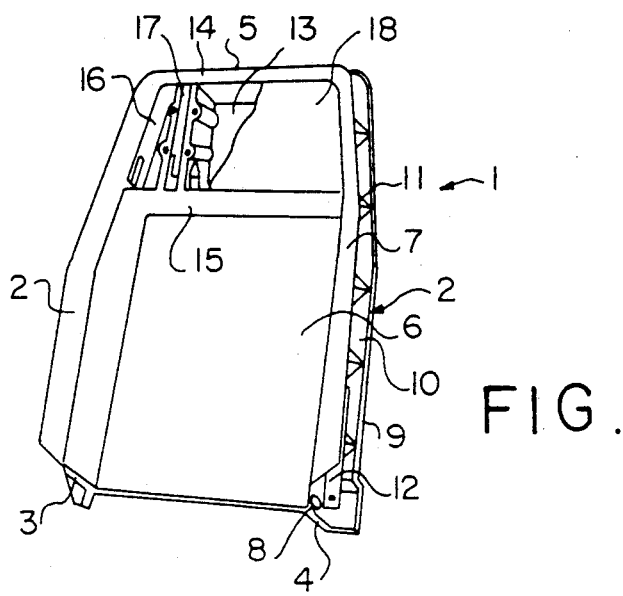
Figure 2:
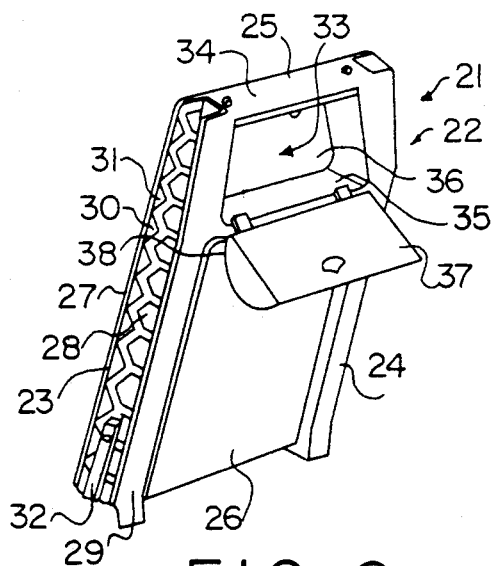
Figure 5:
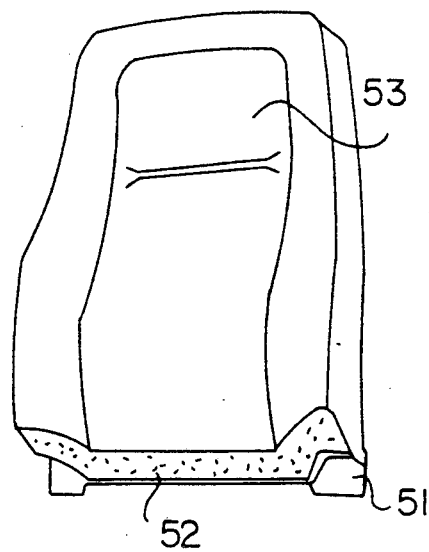

Embodiments of the new vehicle seat back rest with the novel back rest support structure are shown schematically in the drawings and are explained below in greater detail. In the drawings:

FIG. 1 shows a back rest support structure with the cross member open at the front in a three-dimensional representation viewed from front to one side, FIG. 2 shows a back rest support structure with the cross member open at the back in a three-dimensional representation viewed from the back to one side, FIG. 3 shows a cover for a side member in a three-dimensional representation, FIG. 4 shows a sketch of a cross-section through the back rest support structure and FIG. 5 shows a back rest.

In FIG. 1 the back rest support structure 1 consists of an injection molded part made from polyamide-6 containing 35% by weight glass fibers. A frame 2 consisting of side members 3, 4 and a cross member 5 surrounds a back shell 6. The side members 3, 4 are U-shaped in cross-section and each have a front flank 7, a central part 8 and a rear flank 9. Molded ribs 11 are arranged in the cavity 10 thus formed. Reinforcements 12 are provided in the lower region of the cavities 10 in the side members 3, 4 for the connection of the fittings and the adjustment of the angle of tilt of the back rest. The cross member 5, which is closed on the back and thus has a U-shaped cross-section with a wide central part 13, an upper flank 14 and a lower flank 15, connects the upper ends of the side members 3, 4. Molded guides 17 for a head rest are also located in the cavity 16. This cavity 16 is closed by a cover 18 which is sketched in and as a headrest supporting plate, is provided with a stop (not shown) pointing into the cavity 16 for the head rest. The head rest supporting plate 18 is formed in such a way that it fits exactly between the flanks 14, 15 and thus contributes to the strengthening of the structure.

In FIG. 2, the back rest support structure 21 consists of an injection molded part made from a blend of polycarbonate/ABS (acrylonitrile-butadiene-styrene) containing 30% by weight glass fibers. A frame 22 consisting of side members 23, 24 and a cross member 25 surrounds a back shell 26. The side members 23, 24 are U-shaped in cross-section and each have a front flank 27, a central part 28 and a rear flank 29. Molded ribs 31 are arranged in the cavity 30 thus formed. Reinforcements 32 are provided in the lower region of the cavities 30 for the connection of the fittings and the adjustment of the angle of tilt of the back rest. The cross member 25 is closed at the front and in this way forms a U-shaped cross-section with a wide central part 33, an upper flank 34 and a lower flank 35. The cavity 36 thus formed serves as a storage chamber and is provided with a cover 37 constructed as a flap. This flap is provided with a protective cushion on the outside to protect the back occupant in the event of a crash.

FIG. 3 shows a covering 39 for the left-hand side member 23 of FIG. 2 which engages with the snap connections (not shown) in side member 23.

In FIG. 4, there is depicted a view of a preferred cross-section of a side member. Accordingly, the back shell 41 is rounded at 42 with a radius $R=50$ mm, then bent at 43, forming at angle $\alpha_1$ of 45° with the central part 44 of the side member 45. This bend 43 branches, one part turning back at 46 to become the central part 44 and the other part turning at an angle $\alpha_2$ of 15° to become the front flank 47. The rear flank is designated by 48.

In FIG. 5, a back pad 52 and a cover 53 are arranged on the back rest support structure 51.

What is claimed is:

1. A back rest support for a vehicle seat comprising a back shell and a frame surrounding said shell, said frame consisting of
   a) two U-shaped side members, each of said side members comprising 1) a U-shaped cross section, said cross section being formed by a back flank, a front flank, and a central part which connects said shell to the central part of the other member, said U-shaped cross section opening in a direction away from said shell, and 2) an upper end and a lower end, and
   b) a cross member which connects the upper ends of said side members, said cross member comprising a U-shaped cross section, said cross section being formed by an upper flank, a lower flank which connects the upper ends of said side members and which is connected to said shell, and a central part which connects said upper and lower flanks
said shell and said frame having been formed of a single injection molded part.

2. The back rest support structure of claim 1, wherein said shell runs forwards towards said side member and is rounded, then bent, and branches, turning back to become the central part of said side member and running on to become the front flank thereof.

3. The back rest support structure of claim 1, wherein at least one of said members has a covering.

4. The back rest support structure of claim 1, further comprising a plurality of reinforcing arranged in cavities in said members.

5. The back rest support structure of claim 1, characterized in that said U-section side member comprise front flanks which are curved towards the front.

6. The back rest support structure of claim 1, characterized in that said cross member is open towards the front and that a head rest supporting plate forms a cover therefor.

7. A vehicle seat back rest comprising the back rest support of claim 6 and a back pad, said back pad further covering the front face of said cross member.

8. The back rest support structure of claim 1, characterized in that said cross member is open towards the rear to form a storage chamber having a flap associated with its as a cover.

9. The back rest support structure of claim 8, characterized in that said flap is provided on its outside with a protective cushion.

10. A vehicle seat back rest comprising the back rest support structure of claim 1, and back pad which is laterally surrounded by said frame said pad at least partially covering said front flanks of said side members.

11. The vehicle seat back rest of claim 10, characterized in that said back pad covers the outer face of said side members.

* * * * *